(12) United States Patent
Greco et al.

(10) Patent No.: US 6,199,269 B1
(45) Date of Patent: *Mar. 13, 2001

(54) MANIPULATION OF MICROMECHANICAL OBJECTS

(75) Inventors: Nancy Anne Greco, Lagrangeville; Ernest Norman Levine, Poughkeepsie; Michael F. Lofaro, Marlboro, all of NY (US); James Gardner Ryan, Newtown, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,752

(22) Filed: Oct. 23, 1997

(51) Int. Cl.⁷ .................................................. B23P 19/00
(52) U.S. Cl. .................................. 29/700; 29/413; 29/418; 206/372
(58) Field of Search .......................... 29/418, 417, 413, 29/700; 206/717, 372, 713

(56) References Cited

U.S. PATENT DOCUMENTS

| | | | |
|---|---|---|---|
| 2,963,775 | * 12/1960 | Chadwick | 29/417 X |
| 3,609,861 | * 10/1971 | Allison | 29/418 X |
| 4,127,924 | * 12/1978 | Ross | 29/418 X |
| 4,670,092 | 6/1987 | Motamedi | 156/643 |
| 4,916,002 | 4/1990 | Carver | 428/139 |
| 4,968,585 | 11/1990 | Albrecht et al. | 430/320 |
| 5,129,983 | 7/1992 | Greiff | 156/657 |
| 5,151,153 | 9/1992 | Bol | 156/657 |
| 5,159,753 | * 11/1992 | Torrence | 29/418 X |
| 5,987,737 | * 11/1999 | Mieda et al. | 29/418 |

OTHER PUBLICATIONS

A. Chiu, et al., "Thin–film Inductive Heads" IBM Jrl. of Research Development, vol. 40, No. 3, May 1996, pp. 283–297.

* cited by examiner

*Primary Examiner*—Tom Hughes
(74) *Attorney, Agent, or Firm*—Allison D. Mortinger; Christopher D. Wait; Jay H. Anderson

(57) ABSTRACT

An aid to the manipulation of microfabricated micro tools in manufacturing and assembly is disclosed. A sequence of micro tools and a manipulator are connected to one another via attachment links as a combination. The attachment links are optimized to readily allow severing of individual micro tools from the combination as needed. The manipulator provides an aid for handling the combination via probe, pliers, clasping, mating or other device. This facilitates human or machine interaction with the combination of micro tools, either for subsequent processing, or for the assembly of the micro tools into a completed product.

18 Claims, 3 Drawing Sheets

MANIPULATION OF MICROMECHANICAL OBJECTS

FIELD OF THE INVENTION

This invention is directed to micromechanical objects, and more particularly to providing aids in the manipulation of such objects in fabrication and manufacture.

BACKGROUND OF THE INVENTION

Micromechanical objects (also referred to as microstructures or microminiature objects) are formed with photolithographic techniques and other semiconductor integrated circuit processes to define incredibly small monolithic devices or assembled mechanical objects. These objects when formed as a monolithic device, may be a final finished product in and of themselves, for example as a sensor, accelerometer, or a cantilever stylus as used in atomic force microscopy. These formed micro objects may also be used as a sub-element, like a movable joint, gear, or rail slider in the assembly of a more complex item like an actuator or mechanical valve. For either example of micro object, the very small size makes assembly difficult. Grasping an object which is too small to be viewed by the naked eye without an optical aid is difficult and tedious. In many instances the micro object may also be too fragile for such direct contact and handling. This difficulty arises when manipulation is needed for subsequent manufacturing operations involved in the completion of the micro object and in the application of the micro object as a product or as a sub-element in combination with other micro objects. Further, economies of scale dictate that as many micromechanical objects as possible be fabricated at one time, so manufacturing costs are as low as possible. This makes the ordering and arrangement of microfabricated objects important as an aid to the dispensing and application of a micromechanical a product, and to facilitate the assembly of micro objects as sub-elements with other micro objects into mechanical or electrical micro apparatus. Indeed, without care, the damage from jumbling delicate micromechanical objects will impact yield and increase costs to a point where a desirable apparatus is no longer realizable or economical.

Thus, there remains a need for a combination or arrangement of microfabricated objects which will provide effective manipulation of, facilitate the assembly of, and improve the dispensing of, completed micromechanical objects.

SUMMARY OF THE INVENTION

It is therefore an object of the present invention to provide improved manipulation of micromechanical objects.

It is another object of the present invention to provide ease in the simultaneous handling of a large number of micromechanical objects.

It is another object of the present invention to facilitate the assembly of micromechanical objects into completed apparatus and products.

Still yet another object of the present invention is to provide micro objects optimally ordered as an aid to assembling micro apparatus.

In accordance with the above listed and other objects, a combination of microfabricated objects is disclosed which comprises a micro-tool connected via a micro attachment link to a manipulator as an aid for handling the micro-tool.

In the alternative, a combination of microfabricated objects is disclosed comprising a plurality of micro-tools and a manipulator all attached to one another via micro attachment links in a sequence optimized for assembly.

Furthermore, a system for manipulation of microfabricated objects is disclosed which comprises a micro-tool connected to a manipulator via a micro attachment link; where a probe may make connection with the manipulator so as to facilitate the handling of the microfabricated objects in view of a means for micro-observation.

BRIEF DESCRIPTION OF THE DRAWINGS

These and other features, aspects, and advantages will be more readily apparent and better understood from the following detailed description of the invention, in which.

DESCRIPTION OF THE PREFERRED EMBODIMENTS

The present invention is described herein in the context of semiconductor processing merely as a specific example, and is not meant to limit applicability of the invention to semiconductor technology. Those skilled in the art will understand that the invention is broadly applicable to any micromechanical or microminature object.

For purposes of this invention, the term "oxide" layer is used generally to refer to a layer of silicon dioxide, and the silicon dioxide may be undoped or doped, for example, with boron, phosphorous, or both, to form for example borophospohsilicate glass (BPSG), and phosphosilicate glass (PSG). The silicon dioxide layers may be grown or deposited by conventional techniques.

Figure 1:
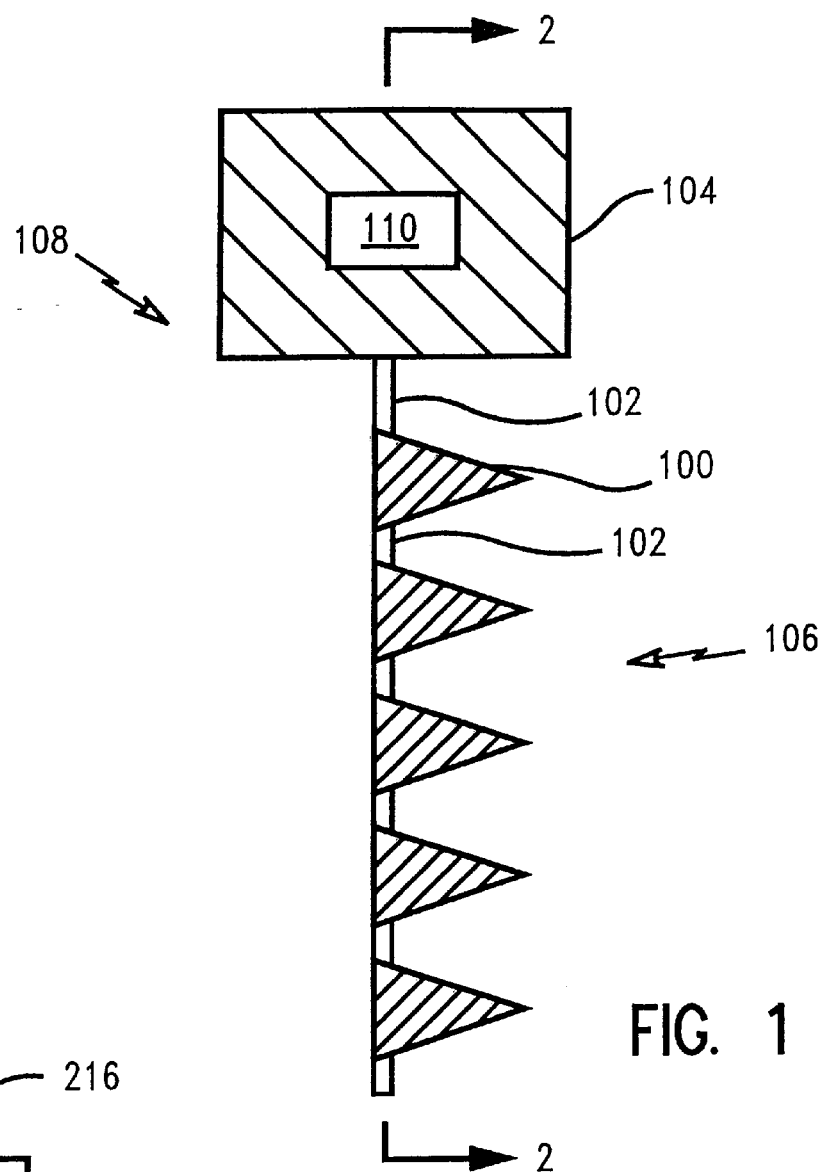
FIG. 1 illustrates the general elements of the present invention.

Referring now to the drawings and more particularly to FIG. 1, there are shown microfabricated objects: a micro-tool (100), a micro attachment link (102) and a manipulator (104). The micro-tool (100) is also commonly referred to as a micromechanical device or microminiature element and as such is understood to encompass any other such items fabricated in general on a very small scale. There are many examples of micromechanical devices. For the purpose of example only, the micro-tool (100) is depicted here as a stylus or microminiature tip, but any other micromechanical device could be substituted in the drawings. When a multiplicity of micro-tools are connected together via micro attachment links as depicted in FIG. 1, an assemblage is created which will be referred to as a grid (106). When a grid (106) of at least one micro-tool (100) is connected via a micro attachment link (102) to a manipulator (104) this will be referred to as a combination (108).

The order of the micro-tools as arranged in the grid (106) may be optimized for assembly. So, if an actuator is to be assembled, a piston object is adjacent to a cylinder, which in turn is adjacent to a sliding rail. This allows the micro objects to be provided in a sequential order arranged to facilitate assembly.

The micro-tool (100), the micro attachment link (102) and the manipulator (104) are fabricated as one continuous item. Between any two adjacent micro fabricated objects there will be at least one continuous layer or thread of material. For example, between any single micro-tool (100) and any micro attachment link (102) there is at least one layer of material which is continuous between them. A similar arrangement would be found between a micro attachment link (102) and a manipulator (104). In a preferred embodiment there would be at least one continuous layer between all the microfabricated objects for the sake of simplicity, manufacturability and cost.

The micro attachment link (102) is generally a narrowing in the unioned shapes of desired micro objects. A micro attachment link (102) may be a discrete link joining two micro objects or alternatively, it may be the result of an overlap in area between two adjacent micro objects. A micro attachment link shall be defined where the shape of two micro-tools (or micro-tool and manipulator) are made continuous via a narrowing provided in their resulting combined shape when unioned. As such the result may be from a small amount of overlap in their shapes when unioned, or the result of an additional shape interposed between them before unioning. The amount of thinning or narrowing provided, shall be the amount needed to allow the separation of individual micro-tools when desired. In a preferred embodiment the separation is accomplished by twisting or snapping the micro-tool (100) to release it from a grid (106) or manipulator (104). However, depending on the material chosen for the micro attachment link (102) the separation could be accomplished by methods including but not limited to: shearing, localized heating, laser ablation, or localized electrical migration by application of electrical current (similar to fuse blowing). In a preferred embodiment the micro attachment link (102) is made of a metallic, so when provided in a suitable shape, it may be bent as an aid in the positioning of a micro-tool (100). However, other materials are anticipated, including but not limited to, polymeric materials and oxides.

The combination (108) may be fabricated in a number of different ways. In a preferred embodiment, the fabrication is by microcasting. Microcasting is defined as any methodology or process which creates a micro object by providing a micro cavity within a sacrificial layer, into which material is subsequently deposited. The casting into the cavity may be achieved for example by plating or chemical vapor deposition. Any excess material from the deposition may be removed by chemical mechanical polishing or by etch back using Reactive Ion Etching (RIE). The microcast shape is then freed by dissolving the sacrificial layer. An alternative fabrication approach is to define objects by the subtractive removal of material deposited on a substrate using RIE. Once the objects are defined they are freed from the substrate by dissolution of an intermediate sacrificial layer.

The manipulator (104) is provided as a handling aid. This is because direct manipulation of the micro-tool (100) may be difficult, awkward, or even destructive. The size of the manipulator (104) is typically large relative to the micro-tool (100). The shape of the manipulator is optimized for the manner in which it is to be grasped or attaches to by a probe and is preferably flat so as to be most compatible with the desired micro fabrication process. In FIG. 1, a preferred embodiment manipulator (104) is depicted. As such the manipulator (104) includes an aperture (110). The aperture (110) may be of any shape including, round, triangular, square, or as depicted—rectangular. The selected shape is not as significant, as that the shape be keyed to match a corresponding probe. More than one aperture (110) may be provided in a single manipulator (104).

The manipulator (104) may also be made magnetic so as to facilitate the mechanical connection to a probe. The fabrication of a magnetic manipulator is achieved by building at least one layer into the manipulator which consists of a magnetic material. A preferred embodiment would use a nickel iron alloy as the magnetic layer. The fabrication process to enable this layer can use micro-casting as described above, or electrodeposition as is commonly practiced in the art. For an example depicting the use of thin magnetic layers in existing art see, "Thin-film Inductive Heads" A. Chiu, et. al IBM Journal of Research and Development, Volume 40, Number 3, page 283. This desirable effect may be further enhanced by magnetizing the manipulator when fabricated from suitable magnetic material. This is best achieved by selective application of magnetic material to the manipulator (104) portion of the combination (108) only. Then prior to the release of the microobject combination (108) from the substrate, the entire wafer of micro objects is placed in a magnetic field of sufficient strength to permanently magnetize the manipulator.

Figure 2:
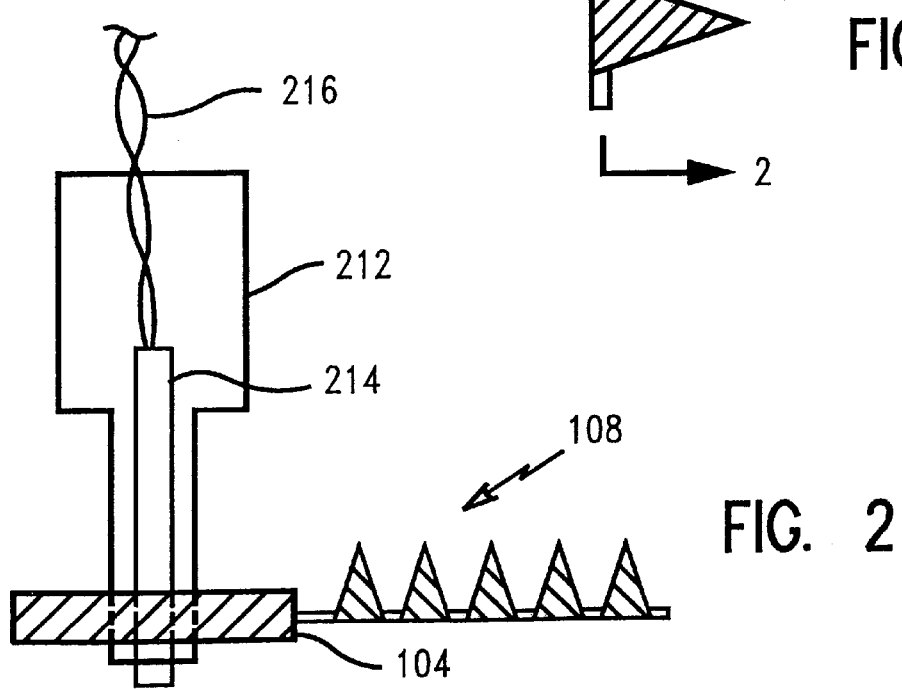
FIG. 2 is a cross section of the present invention taken through line 2—2 of FIG. 1, and showing the insertion of a probe tool.

In FIG. 2, a side view of the combination (108) is shown. A probe tool (212) has been inserted through the aperture of manipulator (104). The probe tool (212) in a preferred embodiment is keyed to match the keyed aperture. There is an advantage to using differently keyed apertures where an assembly is being made that uses multiple micro tools from different combinations. Incorrect assembly may be avoided by keying the two combinations with differing apertures.

A manipulator fabricated of magnetic material may be used in conjunction with a probe tool (212) provided with a electromagnet (214). Application of current via wires (216) to the electromagnet (214) will induce lines of magnetic flux thereby providing an attractive force to any magnetic material. In this manner an operator may controllably switch on the probe tool (212) which in combination with close proximity to a desired combination (108), will allow manipulation of a desired micro-object via magnetic attraction to the probe.

Figure 3:
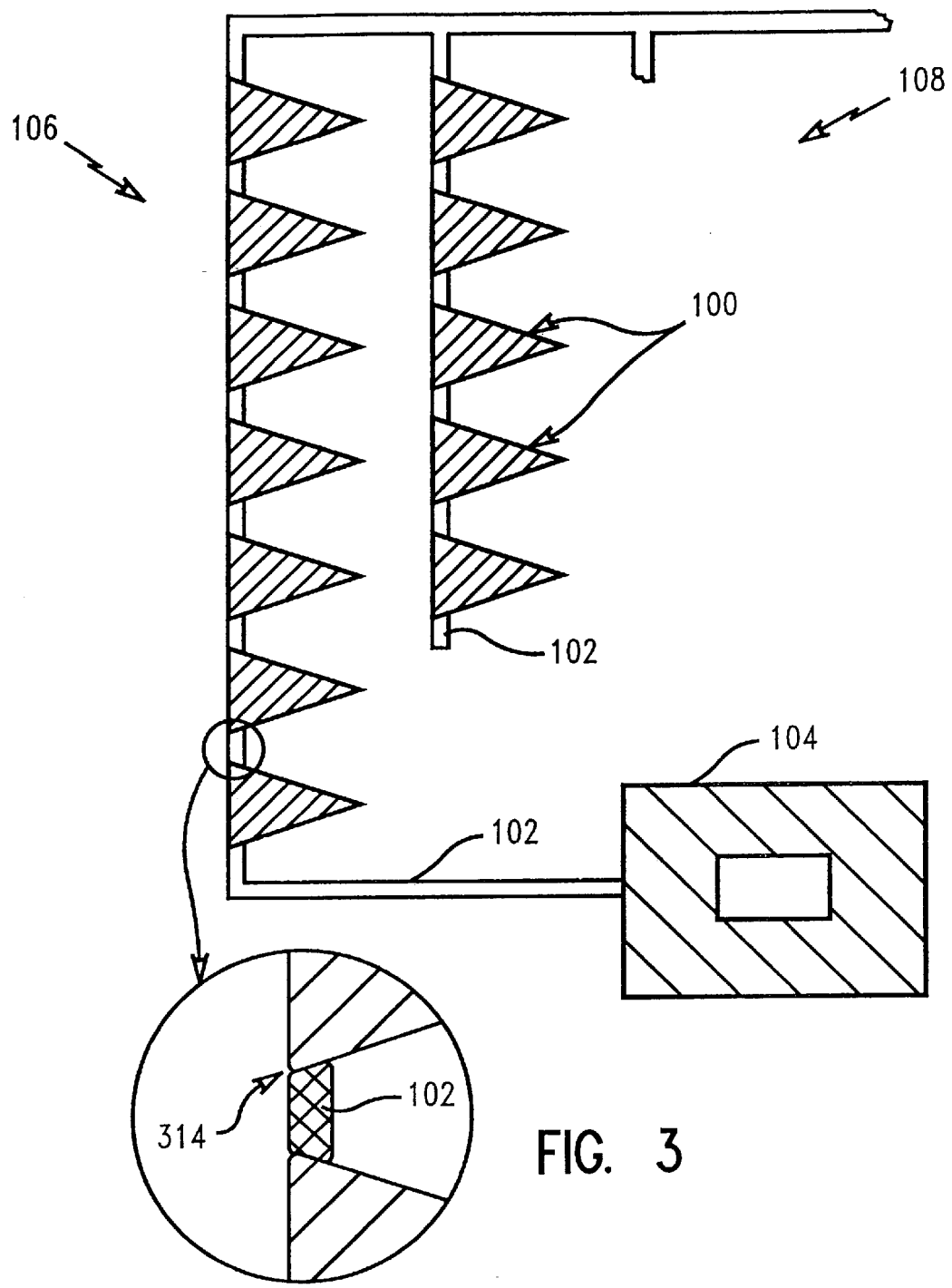
FIG. 3 illustrates a grid of microfabricated objects of a preferred embodiment for the present invention; and, FIG. 4 illustrates the general elements of a system for the manipulation of microfabricated objects as regards the present invention.

Turning now to a preferred embodiment as shown in FIG. 3. The combination (108) remains comprised of a manipulator (104) and grid (106), but here the grid is composed of columns, or in the alternative, rows of micro-tools (100). A micro attachment link (102) is disclosed in both short and long structural link formats. A micro attachment link if made of a ductile or other suitably flexible material may be used to advantage by bending and thereby aid in the handling and manipulation of a micro-tool. This advantage may be particularly realized when the micro attachment link is in its long structural format. Where a distinct break or shear line is desired upon the separation of a micro-tool(100) from a micro attachment link (102), dimples (314) may be provided to narrow the micro attachment link (102) at the desired location. In a preferred embodiment, the flexible material is a metal such as aluminum.

Figure 4:
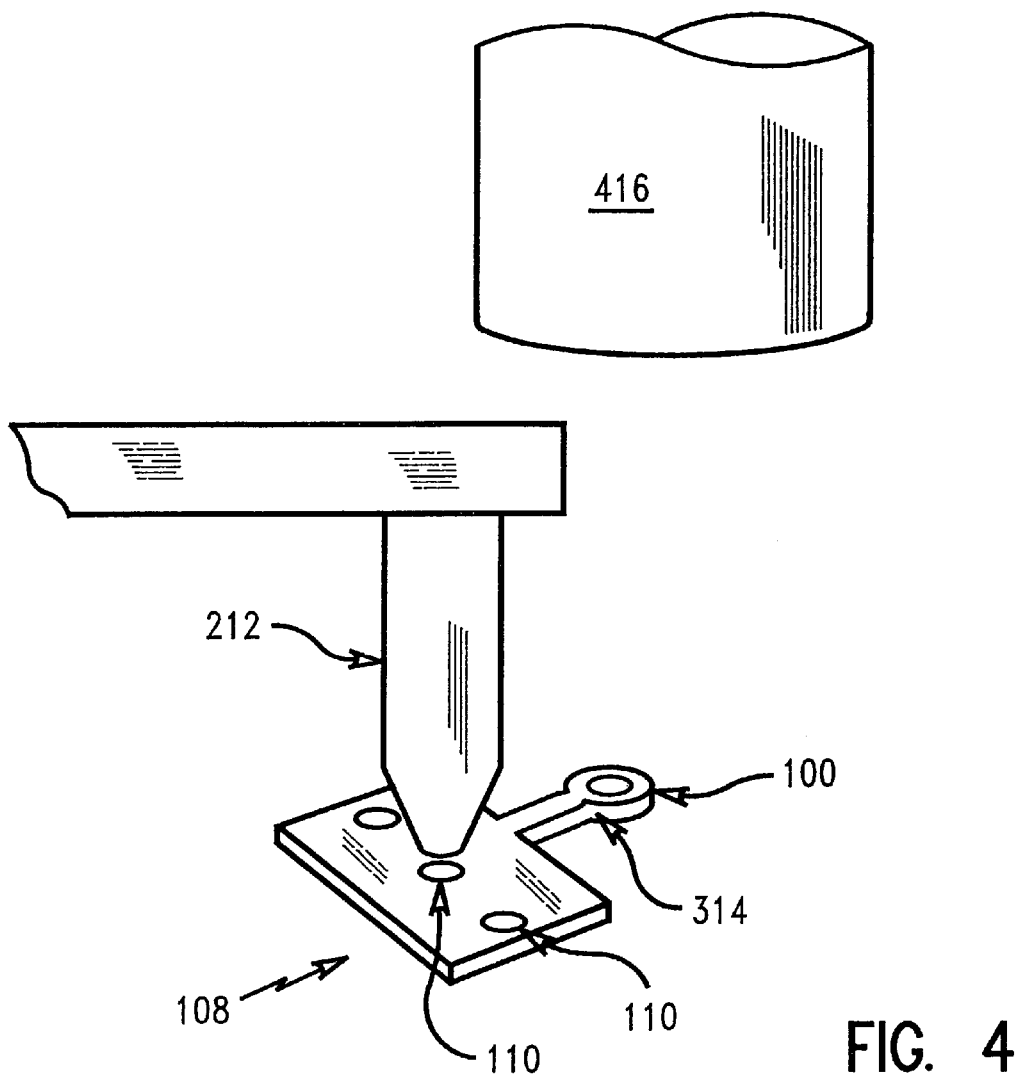

In FIG. 4, a system for manipulation of microfabricated objects is depicted comprising a combination (108) engaged by a probe tool (212) within the purview of a microscope or other means for micro-observation (416). This allows an operator to observe and assemble micro fabricated objects by providing the operator a view of the objects, and via servo-controls, manipulation of the probes and hence the microfabricated objects.

In summary, a combination of microfabricated objects has been described which provides improved handling of micromechanical devices. The manipulator allows the combination to be grasped and maneuvered without damage to the micromechanical devices. The micro attachment links allow the simultaneous handling of a large number of micromechanical devices. Finally, the combination allows the optimum ordering of micro objects as an aid in the assembly of micro apparatus.

While the invention has been described in terms of several preferred embodiments, various alternatives and modifications can be devised by those skilled in the art without departing from the invention. Accordingly, the present invention is intended to embrace all such alternatives which fall within the scope of the appended claims.

What is claimed is:

1. A combination of microfabricated objects, comprising:
   a plurality of micro-tools;
   a plurality of micro attachment links; and
   a manipulator larger in size than the micro-tools;
   the micro-tools being connected only by the micro attachment links, the micro-tools and micro attachment links forming a linear array having a distal end and a proximal end with respect to the manipulator, the array being connected at the proximal end to the manipulator by a micro attachment link and having at the distal end one of (a) a micro-tool and (b) a micro attachment link connected only to a micro-tool,
   so that the combination of microfabricated objects may be handled using the manipulator, and breaking of a micro attachment link connecting a given micro-tool to the array permits movement of the array relative to said micro-tool.

2. The combination of microfabricated objects in claim 1, wherein the micro attachment links are made of a material suitable for separating the micro-tool by localized heating.

3. The combination of microfabricated objects in claim 1, wherein the micro attachment links are made of a material suitable for separating the micro-tool by laser ablation.

4. The combination of microfabricated objects in claim 1, wherein the micro attachment links are made of a material suitable for separating the micro-tool by application of electrical current.

5. The combination of microfabricated objects in claim 1, wherein the micro attachment links are made of a material suitable for separating the micro-tool by physical force.

6. The combination of microfabricated objects in claim 5, wherein the physical force is snapping.

7. The combination of microfabricated objects in claim 1, wherein the micro attachment links are made of a ductile material which may be bent, thus allowing maneuvering of the micro-tool at an angle relative to another micro object.

8. The combination of microfabricated objects in claim 1, wherein the micro attachment links are made of a polymeric material.

9. The combination of microfabricated objects in claim 1, wherein the micro attachment links are made of a metallic material.

10. The combination of microfabricated objects in claim 1, wherein the micro attachment links are made of an oxide material.

11. The combination of microfabricated objects in claim 1, wherein the manipulator has an aperture formed therein.

12. The combination of microfabricated objects in claim 1, wherein the manipulator has an aperture which is keyed to a mating tool.

13. The combination of microfabricated objects in claim 1, wherein the manipulator is made of a magnetic material.

14. The combination of microfabricated objects in claim 1, wherein the manipulator is made of a magnetized material.

15. The combination of microfabricated objects in claim 1, wherein the micro-tools in the linear array are arranged in an order optimized for assemble of the micro-tools into a micro apparatus.

16. A system for manipulation of microfabricated objects, comprising:
   a plurality of micro-tools;
   a plurality of micro attachment links;
   a manipulator larger in size than the micro-tools;
   a probe tool; and
   means for micro-observation;
   where the micro-tools are connected only by the micro attachment links, and a combination of micro fabricated objects is formed by connecting the micro-tools by the micro attachment links to form a linear array having a distal end and a proximal end with respect to the manipulator, the array being connected at the proximal end to the manipulator by a micro attachment link and having at the distal end one of (a) a micro-tools and (b) a micro attachment link connected only to a micro-tool,
   whereby the combination of microfabricated objects may be handled by coupling the probe tool to the manipulator, and breaking of a micro attachment link connecting a given micro-tool to the array permits movement of the array relative to said micro-tool, all while in view of the means for micro-observation.

17. The system for manipulation of microfabricated objects of claim 16, wherein the manipulator has an aperture which is keyed so as to mate with the similarly keyed probe tool.

18. The system for manipulation of microfabricated objects of claim 16, wherein the probe tool is provided with an electro magnet.

* * * * *